United States Patent [19]

Daimer et al.

[11] Patent Number: 4,659,800

[45] Date of Patent: Apr. 21, 1987

[54] PROCESS FOR PRODUCING CATHODICALLY DEPOSITABLE PAINT BINDERS

[75] Inventors: Wolfgang Daimer; Rudolf Schipfer, both of Graz; Günther Monschein, Kalsdorf, all of Austria

[73] Assignee: Vianova Kunstharz, A.G., Werndorf, Austria

[21] Appl. No.: 833,014

[22] Filed: Feb. 26, 1986

[30] Foreign Application Priority Data

Feb. 26, 1985 [AT] Austria ................................ 564/85

[51] Int. Cl.$^4$ ............................................. C08G 59/00
[52] U.S. Cl. ................................ 528/103; 204/181.7; 523/414; 525/526
[58] Field of Search ................ 525/481, 526; 528/103, 528/110; 523/414; 204/181.7

[56] References Cited

U.S. PATENT DOCUMENTS

| | | | |
|---|---|---|---|
| 3,299,169 | 1/1967 | Smith | 528/103 |
| 4,035,275 | 7/1977 | Sturni et al. | 204/181.7 |
| 4,104,147 | 8/1978 | Marchetti et al. | 204/181.7 |
| 4,148,772 | 4/1979 | Marchetti et al. | 523/414 |

*Primary Examiner*—Veronica P. Hoke
*Attorney, Agent, or Firm*—A. W. Breiner

[57] ABSTRACT

Cathodically depositable binders water-dilutable upon neutralization comprising the reaction product of amine adducts of polyglycidylethers of polyphenols having an amine value based on tertiary amine groups of between about 30 and about 130 mg KOH/g, a hydroxy value based on primary hydroxy groups of between about 20 and about 200 mg KOH/g, and an average molecular weight of from about 1000 to about 20,000 with 0.5 to 20% b.w. based on the weight of the adduct of a polyoxyalkylene glycidyl ether to provide an adduct having polyoxyalkylene segments. The introduced hydrophilic segments allow for a reduction in the degree of neutralization necessary for stability of an electrodeposition bath which favorably influences the deposition equivalent and throwing power of the binder in a cathodic electrodeposition system.

16 Claims, No Drawings

PROCESS FOR PRODUCING CATHODICALLY DEPOSITABLE PAINT BINDERS

FIELD OF INVENTION

The present invention relates to cathodically depositable paint binders based on modified epoxy-amine adducts and to their process of preparation. More particularly, the invention relates to epoxide-amine adducts reacted with polyoxyalkylene glycidyl ethers to provide epoxide-amine adducts with polyoxyalkylene segments.

BACKGROUND AND PRIOR ART

The process of electrodeposition, in various steps of operation, imposes a contradictory behavior on the paint binders being deposited. On the one hand, the binders or the components of the binders should have a low viscosity, with low quantities of organic solvents, in order to permit ease of pigment loading and processing of the electrodeposition paints. On the other hand, a sufficiently high molecular weight and thus a high viscosity is a preliminary condition for the required resistance characteristics of the stoved film. There is a similar contradiction between a desired good solubility and dispersibility in water of the binder as an essential carrier medium on electrodeposition and the formation of a hydrophobic film after protonation on electrodeposition and after crosslinking. Contradictory exigencies also apply to the formation of a high electric film resistance on deposition in order to achieve a high throwing power versus high film thickness which can only be achieved with a low electric film resistance.

The literature discloses numerous attempts to achieve a compromise between optimum solubility and dispersibility of the protonized binder and the deposition characteristics and the properties of the crosslinked paint film including through the use of a variety of modifications of bisphenol A or phenol-novolak-epoxy resin-amine adducts. In U.S. Pat. Nos. 4,104,147 and 4,148,772, for example, the epoxy resin based on bisphenol A and epichlorohydrin, prior to the reaction with an amine, is reacted with a polytetramethylene glycol to prolong the chain and to thus introduce a hydrophilic segment. Also, U.S. Pat. Nos. 3,839,352 and 4,035,275 propose a chain prolongation with polypropylene glycol prior to the reaction with an amine. EP-A2-00 74 634 discloses chain prolongation of low molecular weight bisphenol A epoxy resins with bisphenol A ethylene oxide adducts.

The essential disadvantage of all these prior methods is the reduced controllability of the chain prolonging reactions, because self-condensation of the epoxy resin cannot be prevented. Even if the intermediates have the theoretical epoxy value, the presence of free polyols cannot be excluded, entailing an essential influence on various properties of the binder.

Epoxy-amine adducts based on polyoxyalkylene glycidyl ethers, disclosed as for example in U.S. Pat. No. 4,035,275, show extremely good water-solubility. However, electrodeposition of these binders to give satisfactory films is extremely difficult. Also, the resistance characteristics are very unsatisfactory, as could be expected.

Cationic modified epoxy resins soluble in water at a pH-value of over 7 can be obtained by introducing quarternary ammonium groups, i.e., by reaction of the epoxy groups with tertiary amines in the presence of acids and/or water. Products of this type, as are disclosed for example in U.S. Pat. No. 4,035,275, proved suitable as the sole binders for practical use only in case of reduced requirements and are primarily used as addition binders only.

SUMMARY AND GENERAL DESCRIPTION OF INVENTION

It has now been found that it is possible to introduce in a simple and easily controllable way polyoxyalkylene segments into epoxide-amine adducts by subsequent reaction of the epoxy resin amine adduct with polyoxyalkylene glycidyl ethers.

The present invention is thus concerned with cathodically depositable binders water-dilutable upon protonation, based on polyoxyalkylene modified epoxy resin amine adducts and a process for their production, characterized in that amine adducts of polyglycidyl ethers of polyphenols, with the adducts having an amine value stemming exclusively from tertiary amine groups, of between about 30 and about 130 mg KOH/g, a number of primary hydroxy groups corresponding to a hydroxyl value of between about 20 and about 200 mg KOH/g and an average molecular weight of from about 1,000 to about 20,000, are reacted at from about 60° to about 150° C. with from about 0.5 to about 20% by weight (b.w.) of polyoxyalkylene glycidyl ethers, preferably with polyoxy-[($C_2$-$C_3$)-alkylene]diglycidylethers, to an epoxy value of practically zero.

It has now been shown that by this method of introducing hydrophilic segments the solubility of the partially protonized polymer can be substantially improved without the disadvantages of the heretofore known products. The enhanced hydrophilic character of the polymers allows for a reduction of the degree of neutralization necessary for the stability of the bath which, in turn, favorably influences the deposition equivalent (mg/Cb) and the throwing power.

Although the reaction mechanism is not yet fully understood, the reaction can be monitored by recording the reduction in the glycidyl group content. The formation of disturbing substances which are extremely water-soluble, for example through reaction of polyoxyalkylene glycidyl ethers with free low molecular weight secondary or primary amines, is practically impossible. Further, a negative influence on the resistance characteristics of the crosslinked films based on paints with the binders of the invention was not observed.

Suitable polyglycidyl ethers of phenols for the preparation of the amine adducts are known from the literature and are commercially available. Examples of polyphenols reacted with epihalohydrines to give the corresponding polyglycidyl ethers are bis(4-hydroxyphenyl)-2,2-alkanes, the alkane radical being either ethane, propane, or butane. Examples of other polyphenols are 4,4'-dihydroxybenzophenone; 1,5-dihydroxynaphthalene, or phenol novolaks. The preferred products are diglycidylethers of bisphenol A and polyglycidylethers of phenol novolaks. Particularly suitable for the products produced according to this invention are glycidyl ethers with an epoxy equivalent weight of from about 170 to about 1,000.

Optionally, the glycidyl ethers may be partially defunctionalized prior to the reaction with the amines by other epoxy-reactive compounds. This can be effected, for example, with monocarboxy compounds such as monocarboxylic acids with various chain lengths or with monoesters of dicarboxylic acids, favorably with long chain dicarboxylic acids, such as adipic acid or its higher homologues as well as with dimerized fatty acids, and the like. To a lesser extent, polycarboxy compounds may also be used for this purpose, such as maleinized oils or polydienes. A particularly preferred method is a partial defunctionalized with carboxy group containing polyesters which may optionally be modified with fatty acids. The polyesters and alkyd resins are preferably formulated in order that they still carry free primary hydroxy groups.

Amines suitable for the preparation of the amine adducts are primary and secondary alkyl amines, and the corresponding mono- and dialkanol amines, as well as primary-tertiary and secondary-secondary diamines. The various representatives of this group are known to one skilled in the art and require no further explanation. Optionally, the simple low molecular weight amines may be replaced partially or totally by higher molecular weight amines. Should the amines carry other functional groups, these should be groups which do not react with the epoxy groups under the reaction conditions used. For example, the amines may contain acid amide groups.

The quantity of amine and epoxy resin modifier is chosen in order that the resulting adduct is free from epoxy groups and carries tertiary amine groups only, and in that it has an amine value of between 30 and 120 mg KOH/g and carries primary hydroxy groups corresponding to a hydroxyl value of from 20 to 200 mg KOH/g. The molecular weight of the optionally modified amine adducts used according to the invention ranges between about 1,000 and about 20,000.

The amine adducts are prepared in known manner, the optional modification of the epoxy resins being carried out prior to the reaction with the amine. Normally, through the modifiers, not more than 50 mole-% of the epoxy groups should be defunctionalized. The reactions are carried out at temperatures of between 90° and 140° C., favorably in a solvent inert to the reaction. Suitable solvents for use herein are glycol mono- and diethers, such as ethylene glycolmonoethyl ether, ethylene glycol monobutylether, propylene glycol monomethylether, diethyleneglycol diethylether, dipropylene glycol monomethylether, or ketones, such as methylisobutylketone, methylethylketone or cyclohexanone, and aromatic hydrocarbon solvents such as toluene or xylene.

In a further reaction step, the amine adducts are reacted at from 60° to 150° C. with 5 to 20% b.w., calculated on the weight of the epoxy resin-amine adducts, of a polyoxyalkylene glycidyl ether to an epoxy value of practically zero.

Suitable polyoxyalkylene glycidyl ethers are the mono- or diglycidyl ethers of poly(oxyethylene)glycols, poly(oxypropylene)glycols, poly(oxytetramethylene)glycols with molecular weights ranging between about 300 and about 850. Preferred compounds are poly(oxyethylene)glycol diglycidyl ethers and poly(oxypropylene)glycol diglycidyl ethers of polyglycols with a molecular weight of between 350 and 750. The particularly preferred compounds have the general formula

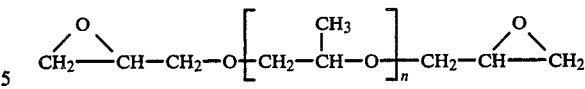

wherein n ranges between 2 and 20.

Optionally, subsequent to the reaction, the organic solvent may be partially vacuum-stripped. This reaction step may optionally be carried out after the partial neutralization and dilution with the water of the batch. The alternatives of the method allows the obtaining of materials which contain only small quantities of organic solvents and which thus respond to severe anti-pollution regulations such as the Low VOC-Regulations.

For neturalization, the products produced according to the present invention require from 10 to 40 milliMoles/100 g binder (resin solids) of acid in order to give a stable solution or emulsion free from sediment and suitable for the requirements of electrodeposition. In comparison thereto, the amine adducts free from polyalkylene glycol ethers with the same composition, despite the relatively low molecular weight and the higher amine value, require the use of a neutralizing agent at a level of from 40 to 100 milliMoles/100 g resin solids to give a bath material which can be diluted down to practical needs.

The preparation of the bath material for electrodeposition, pigmentation, neutralization, and dilution are known to one skilled in the art and require no further explanation. The same applies to the deposition and stoving of the deposited films.

The binders prepared according to the invention are combined with crosslinking agents. The crosslinking components which lead to crosslinking by transesterification are disclosed in various patents such as EP-B1-00 12 463, DE-A1-33 15 469, or U.S. Pat. No. 4,458,054. Crosslinking may also be effected by masked isocyanates or amine resins, optionally using catalysts. The stoving temperatures may range from between about 140° to about 190° C., depending on the curing system used.

The products of the invention are used for coatings on a large industrial scale, such as in the automobile industry, where, owing to a size of the installations, the combination of excellent applicational properties with a low degree of neutralization is required.

PRESENTLY PREFERRED EMBODIMENTS OF INVENTION

The following examples illustrate the invention without limiting the scope thereof. Parts and percentages are by weight, unless otherwise stated.

The following abbreviations are used in the examples:
EPH: Epoxy resin
 EPH I: Polyglycidylether of a phenol novolak resin, having an approximate epoxy equivalent weight of 170.
 EPH II: Diglycidylether of bisphenol A, based on the reaction of bisphenol A and epichlorohydrin, having an approximate epoxy equivalent weight of 180.
 EPH III: Diglycidylether of bisphenol A based on the reaction of bisphenol A and epichlorohydrin, having an approximate epoxy equivalent weight of 475.
 EPH IV: Diglycidylether of bisphenol A based on the reaction of bisphenol A and epichlorohydrin, having an approximate epoxy equivalent weight of 920.
EEW: Epoxy equivalent weight
LM: Solvent used during reaction
PM: Propylene glycol monomethyl ether
EGL: Ethylene glycol monoethyl ether ether is added and the reaction is carried, at 120° C., to the total consumption of the glycidyl groups. The reaction product is diluted with the solvent to a solids content of 70%. Weight ratios and types of the starting materials are listed in Table 1. Examples 1(V) and 4(V) are comparison examples.

TABLE 1

| Example | EPH Parts | EPH (Val*) | EPH Type | EPH LM | MOD Parts | MOD (COOH—Val) | MOD Type | Amine Parts | Amine (Val) | Amine Type | POAG Parts | POAG (%) | POAG Type |
|---|---|---|---|---|---|---|---|---|---|---|---|---|---|
| 1(V) | 1627 | (3.43) | III | PM | 226 | (0.24) | M 1 | 94.5 | (0.9) | DOLA | — | | |
| | | | | | | | | 67.5 | (0.9) | MEOLA | | | |
| | | | | | | | | 78 | (1.2) | DEAPA | | | |
| 2 | | | | | as in Example 1 | | | | | | 115 | (5) | PPGG |
| 3 | | | | | as in Example 1 | | | | | | 233 | (10) | PPGG |
| 4(V) | | | | | as in Example 1 | | | 146 | (0.9) | MONAM | — | | |
| | | | | | | | | 67.5 | (0.9) | MEOLA | | | |
| | | | | | | | | 78 | (1.2) | DEAPA | | | |
| 5 | | | | | as in Example 2 | | | | | | 115 | (5) | PPGG |
| 6 | | | | | as in Example 2 | | | | | | 238 | (10) | PPGG |
| 7 | 360 | (2.0) | II | MBK | 29 | (0.4) | M 2 | 66 | (0.5) | DPA | 340 | (15) | PBGG |
| | 1306 | (1.42) | IV | EGL | | | | 51 | (1.0) | DMAPA | | | |
| | | | | | | | | 79 | (1.0) | ADP | | | |
| | | | | | | | | 26 | (0.4) | EHA | | | |
| 8 | 578 | (3.4) | I | BGL | 87 | (0.3) | M 3 | 55 | (1.8) | EOLA | 18 | (2) | PEGG |
| | | | | | | | | 142 | (1.1) | DBA | | | |

*Val = Equivalent weight in grams for the designated functional group and, accordingly, is equivalent to groups.

BGL: Ethylene glycol monobutyl ether
MBK: Methylisobutyl ketone
MOD: Carboxy functional modifiers
  M1: Polyester of 3 moles trimethylol propane, 2 moles adipic acid, 1 mole isononanoic acid, and 1 mole tetrahydrophthalic anhydride (acid value: 65 mg KOH/g; carboxy equivalent weight: 942 g)
  M2: Adipic acid (carboxy equivalent weight: 73 g)
  M3: Blend of polymerized fatty acids (80% dimeric fatty acid, 20% trimeric fatty acid) (carboxy equivalent weight: 293 g)
Amines:
  MONAM: HO—CH$_2$—CH$_2$—NH—CH$_2$—CH$_2$N-H—CO—CH$_2$O—OH obtained by reaction of aminoethylethanol amine with glycolic acid butyl ester
  EOLA: Monoethanolamine
  MEOLA: N-methyl-ethanolamine
  DOLA: N,N-diethanolamine
  DPA: N,N-Di-n-propanolamine
  EHA: 2-ethylhexylamine
  ADP: 1-diethylamino-4-aminopentane
  DPA: N,N-dibutylamine
  DMAPA: N,N-dimethylaminopropylamine
  DEAPA: N,N-diethylaminopropylamine
POAG: Polyoxyalkyleneglycidylethers
  PEGG: Polyethyleneglycoldiglycidylether (molecular weight ca. 620)
  PPGG: Polypropyleneglycoldiglycidylether (molecular weight ca. 400)
  PBGG: Polytetramethyleneglycoldiglycidylether (molecular weight ca. 750)

EXAMPLES 1-8

The epoxy resin (EPH) and the carboxy functional modifier (MOD) are charged to a suitable reaction vessel and reacted in the presence of the solvent (LM), at a solids content of 85%, at 110° C. to an acid value of below 0.5 mg KOH/g. After dilution of the batch with further solvent to a solids content of 70%, the blend of the amines, with equal quantities of solvent, is added at 60° C. within 2 hours. The reaction is then carried on at from 70° to 90° C., until the theoretical epoxy value is reached. At 90° C., the polyoxyalkyleneglycol glycidyl The specifications of the products produced according to Examples 1-8 are listed in Table 2.

TABLE 2

| B | Amine value[1] DIN 53 216 | Primary Hydroxy Groups[2] | Neutralization mMol(FA)[3] | pH-Value[4] |
|---|---|---|---|---|
| 1(V) | 80 | 94 | 55 | 6.4 |
| 2 | 76 | 89 | 35 | 6.5 |
| 3 | 72 | 85 | 20 | 6.9 |
| 4(V) | 78 | 92 | 45 | 6.5 |
| 5 | 74 | 87 | 25 | 6.8 |
| 6 | 70 | 82 | 15 | 7.0 |
| 7 | 64 | 25 | 27 | 6.6 |
| 8 | 125 | 115 | 48 | 5.8 |

[1] Calculated on non-volatile solid resin content.
[2] Expressed as hydroxyl value as mg KOH/g (calculated); secondary hydroxy groups are neglected.
[3] Maximum quantity of acid to obtain a stable aqueous solution (15%/1 week, room temperature, without phase separation) (FA = formic acid).
[4] pH-value of the solution prepared with the acid quantity according to (3), measured after 5 hours.

EVALUATION OF THE PRODUCTS ACCORDING TO EXAMPLES 1-8 IN CATHODICALLY DEPOSITABLE PAINTS

The products produced according to the invention are homogeneously blended at 50° C. in the weight ratios listed in Table 3 with a crosslinking component and a catalyst.

Pigment pastes are prepared from these binder solutions according to the formula
  100 parts binder (resin solids)
  18 parts titanium dioxide
  12 parts aluminium silicate pigment
  0.6 parts carbon black
as conventional, and are diluted to 18% solids content with deionized water upon protonation with the quantities of acids listed in Table 2.

The paints are deposited on zinc-phosphated steel panels. Conditions for electrodeposition, curing, and the results of paint evaluation are listed in Table 3.

The following products were used as crosslinking agents:

HK 1: Example 3 of DE-A1-33 15 469
HK 2: Example 1 of U.S. Pat. No. 4,523,007
HK 3: Example 2a of EU-B No. 00 12 463
HK 4: Component B2 of U.S. Pat. No. 4,458,054

The catalysts used for the curing by transesterification were octoates of lead, cobalt, and manganese. The quantities listed in Table 3 refer to 100 parts of resin solids.

TABLE 3

| | Binder Compositions | | | Deposition and Crosslinking | | | Test Results | | |
|---|---|---|---|---|---|---|---|---|---|
| EX | Products of Examples (parts) | Cross-linker parts | Catalyst | Deposition sec/Volt | Cure min/°C | Film Thickness μm | Hardness Konig, sec DIN 53 157 | Erichsen Indentation DIN 53 156 mm | Salt Spray ASTM B-11764 h$^x$ |
| 1 | 70 | 30 HK 1 | 1 Pb | 150/330 | 30/160 | 27 | 180 | 6.8 | >1000 |
|   |    |         |      |         | 30/150 |    | 172 | 6.6 |       |
| 2 | 70 | 30 HK 1 | 1 Pb | 150/330 | 30/160 | 26 | 175 | 7.0 | >1000 |
|   |    |         |      |         | 30/150 |    | 170 | 6.7 |       |
| 3 | 70 | 30 HK 1 | 1 Pb | 150/330 | 30/160 | 25 | 170 | 5.8 | >1000 |
|   |    |         |      |         | 30/150 |    | 162 | 5.5 |       |
| 4 | 75 | 25 HK 2 | 0.2 Co | 150/300 | 20/180 | 24 | 185 | 5.4 | 920 |
|   |    |         |      |         | 30/160 |    | 168 | 5.2 |     |
| 5 | 75 | 25 HK 2 | 0.2 Co | 150/300 | 20/180 | 24 | 182 | 5.7 | 920 |
|   |    |         |      |         | 30/160 |    | 166 | 5.0 |     |
| 6 | 75 | 25 HK 2 | 0.2 Co | 150/300 | 20/180 | 22 | 175 | 5.8 | 920 |
|   |    |         |      |         | 30/160 |    | 159 | 5.2 |     |
| 7 | 72 | 28 HK 3 | 0.8 Pb | 120/250 | 20/180 | 26 | 173 | 6.9 | 840 |
| 8 | 78 | 22 HK 4 | 0.3 Mn | 120/380 | 30/180 | 33 | 188 | 5.1 | 970 |

$^x$2 mm peel-off

As will be apparent to one skilled in the art, various modifications can be made within the scope of the aforesaid description. Such modifications being within the ability of one skilled in the art form a part of the present invention and are embraced by the appended claims.

It is claimed:

1. Cathodically depositable binders water-dilutable upon protonation comprising the reaction product of amine adducts of polyglycidylethers of polyphenols, having an amine value, stemming exclusively from tertiary amine groups, of between about 30 and about 130 mg KOH/g, a hydroxyl value stemming exclusively from primary hydroxyl groups of between about 20 and about 200 mg KOH/g and an average molecular weight of from about 1000 to about 20,000, with from 0.5 to 20% b.w. based on said adduct of polyoxyalkylene glycidyl ethers to provide an adduct having polyoxyalkylene segments and an epoxy value of practically zero.

2. Binder according to claim 1 wherein said polyglycidylethers of polyphenols have an epoxy equivalent weight of from about 170 to 1000.

3. Binder according to claim 1 wherein said polyglycidylethers of polyphenols are based on bisphenol A.

4. Binder according to claim 1 wherein said polyglycidylethers of polyphenols are based on phenol novolaks.

5. Binder according to claim 3 wherein said polyglycidylethers of polyphenols, prior to the reaction with the amines, are partially defunctionalized to a maximum of 50% calculated on the glycidyl groups with an epoxy-reactive compound.

6. Binder according to claim 3 wherein the amine adducts contain secondary hydroxy groups in addition to said primary hydroxy groups.

7. Binder according to claim 5 wherein the epoxy-reactive compound to effect partial defunctionalization is a polyester or alkyd resin carrying primary hydroxy groups and carboxy groups.

8. Binder according to claim 1 wherein the polyoxyalkylene glycidyl ether is a polyoxy-[($C_2$–$C_3$)-alkylene]-diglycidylether.

9. Process for producing cathodically depositable binders water-dilutable upon protonation, based on polyoxyalkylene modified epoxy resin-amine adducts, characterized in that amine adducts of polyglycidylethers of polyphenols, with the adducts having an amine value, stemming exclusively from tertiary amine groups, of between 30 and 130 mg KOH/g, primary hydroxy groups corresponding to a hydroxyl value of between 20 and 200 mg KOH/g and an average molecular weight of from 1000 to 20,000, are reacted at from 60° to 150° C. with from 0.5 to 20% b.w. of polyoxyalkylene glycidyl ethers to an epoxy value of practically zero.

10. Process according to claim 9 wherein the polyoxyalkylene glycidyl ether is a polyoxy-[($C_2$–$C_3$)-alkylene]-diglycidylether.

11. Process according to claim 9 wherein said polyglycidylethers of polyphenols have an epoxy equivalent weight of from about 170 to 1000.

12. Process according to claim 9 wherein said polyglycidylethers of polyphenols are based on bisphenol A.

13. Process according to claim 9 wherein said polyglycidylethers of polyphenols are based on phenol novolaks.

14. Process according to claim 12 wherein said polyglycidylethers, of polyphenols, prior to the reaction with the amines, are partially defunctionalized to a maximum of 50% calculated on the glycidyl groups with an epoxy-reactive compound.

15. Process according to claim 12 wherein the amine adducts contain secondary hydroxy groups in addition to said primary hydroxyl groups.

16. Process according to claim 14 wherein the epoxy-reactive compound to effect partial defunctionalization is a polyester or alkyd resin carrying primary hydroxy groups and carboxy groups.

* * * * *